Nov. 30, 1948.                R. JOHNSON                    2,454,804
                         MANUFACTURE OF TETRALOL
                           Filed March 20, 1946
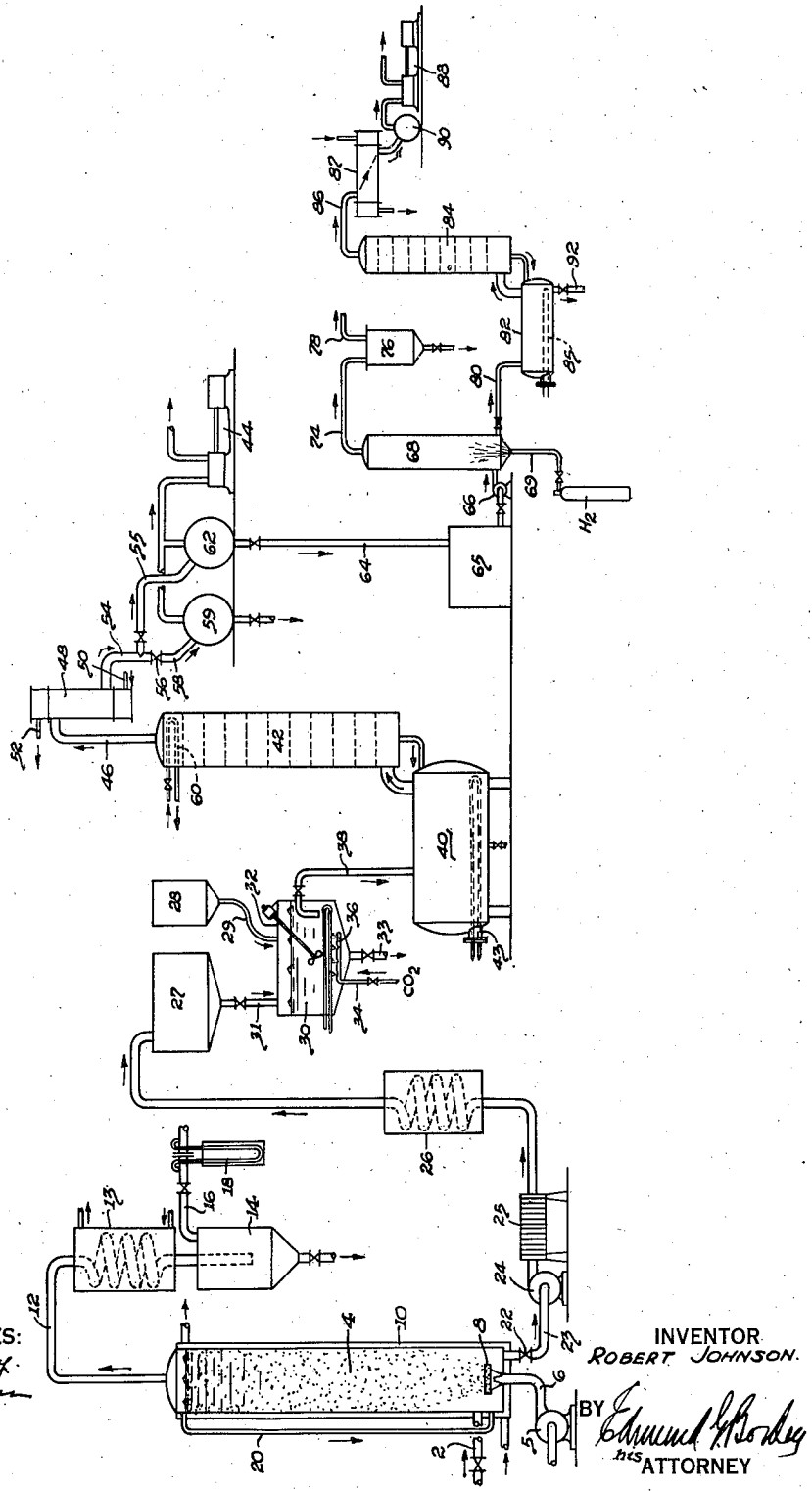
WITNESSES:                                              INVENTOR
                                                    ROBERT JOHNSON.
                                                    BY
                                                       his ATTORNEY Patented Nov. 30, 1948

2,454,804

UNITED STATES PATENT OFFICE 2,454,804

MANUFACTURE OF TETRALOL

Robert Johnson, Verona, Pa., assignor to Koppers Company, Inc., Pittsburgh, Pa., a corporation of Delaware Application March 20, 1946, Serial No. 655,773

6 Claims. (Cl. 260—618)

The present invention relates to the manufacture of intermediate oxidation products of tetralin, and has reference more particularly to the manufacture of substantially pure crystalline alpha tetralol.

It is known that tetralin (tetrahydronaphthalene) is readily oxidizable in the presence of air at elevated temperatures and that its oxidation products include tetralin peroxide, alpha tetralone, alpha tetralol, and minor acidic products, such as phthalic acid. Methods for the control of this oxidation have been limited on account of the relative instability of certain of the oxidation products sought to be obtained and especially by the difficulty of separating such of the compounds as alpha tetralone and alpha tetralol. The alpha tetralone and alpha tetralol boil at almost the same temperature and are somewhat unstable even at the lower temperatures employable by distilling under reduced pressures. The recovery, therefore, of pure crystalline tetralol has heretofore required, in the only reported instance of its preparation, the use of a reactant chemical to remove tetralone from the mixture. Cf. Schroeder, German Patent 709,322.

It is an object of the present invention to provide a simple and efficient process for the oxidation of tetralin to produce improved yields of pure crystalline tetralol therefrom.

It is another object of the invention to provide a controlled process of tetralin oxidation whereby the production of acidic oxidation products is reduced to a minimum and optimum yield of tetralol is obtained.

The invention has for further objects such other improvements and such other operative advantages or results as may be found to obtain in the processes or apparatus hereinafter described or claimed.

Briefly stated, the present invention comprehends the controlled oxidation of tetralin in liquid phase by reacting the tetralin with air or oxygen at atmospheric or superatmospheric pressures to a degree of oxidation whereby preponderantly tetralin peroxide is produced. The use of a catalyst in suspension in the tetralin is preferred as higher conversions to the peroxide can then be accomplished without excessive loss of tetralin to more completely oxidized products. The tetralin peroxide is removed from the oxidation zone and is treated with an aqueous solution of alkali-metal hydroxide to convert the peroxide to a mixture of alpha tetralol and alpha tetralone under conditions favoring hydrolysis and the formation of tetralol. The mixture is thereafter distilled to separate unreacted tetralin from the tetralone-tetralin mixture. The mixture is then hydrogenated over copper oxide-chromium oxide catalyst and substantially all of the tetralone is converted to tetralol. A minor amount of tetralin that is formed by the hydrogenation is then distilled therefrom and residue comprising substantially only alpha tetralol is obtained. Repeated fractional recrystallizations from a hydrocarbon solvent provide a pure alpha tetralol having a melting point of 32.3° C.

In the accompanying drawing forming a part of this specification, the figure is a flow sheet of an apparatus in which a preferred form of the process may be carried out.

With reference to the drawing, tetralin is flowed in liquid form through a pipe 2 into a jacketed reactor column 4 and the reactor is charged thereby to substantially its full height. Air or oxygen is pumped by a pump 5 through a pipe 6 and distributed by porous carbon 8 into the tetralin. The dispersed air or oxygen passes through the liquid tetralin and reacts therewith to provide oxidation products. The temperature is controlled by water at a suitalbe temperature contained in a water jacket 10. Unreacted oxygen and fixed gases flow from the reactor through a pipe 12 and a condenser 13 into a collecting trap 14 wherein suspended tetralin and reaction products are collected. The gases thereafter are flowed from the trap 14 through a valved pipe 16 and their flow rate is determined by a flowmeter 18.

During the period of the oxidation reaction tetralin circulates concurrently with the air stream in the reactor and flows from the top of the reactor through a recirculation pipe 20 back into the bottom. After the reaction has been continued until an optimum percentage of the tetralin has been oxidized, the air is shut off. Tetralin and oxidation products are then drained from reactor 4, by opening valve 22 in pipe 23, and are pumped by a pump 24 through a filter 25 for removal of catalyst therefrom, and then through a cooling core 26 into a vessel 27. Aqueous caustic soda solution that is stored in tank 28 is flowed through valved pipe 29 into a mixing tank 30. Oxidation product flowing from vessel 27 through valved pipe 31 is added slowly to the caustic solution to avoid formation of excessively high temperatures. The reaction mixture is agitated by a stirrer 32. The caustic in dilute solution decomposes tetralin peroxide which comprises the major portion of the oxidation products of the tetralin. The decomposition products are alpha tetralol and alpha tetralone. When reaction is completed, caustic and absorbed acidic oxidation products of the tetralin are drained from the vessel 30 through a pipe 33. The caustic can be recycled to storage in tank 28 and be re-used. Carbon dioxide flowing through a pipe 34 and gas distributing nozzles 36 is then injected into the remaining tetralin and unreacted oxidation products. The carbon dioxide is employed to neutralize any caustic remaining in the tetralin layer.

The tetralin and oxidation products comprising largely tetralone and tetralol are decanted from the vessel 30 through a pipe 38 and into a still 40 having a fractionating column 42. The still 40 is supplied with a steam coil 43. The admixture is distilled under vacum provided by a vacuum pump 44. Tetralin is first distilled from the mixture, is flowed from the top of the fractionating column 42 through a pipe 46 into a condenser 48, conventionally supplied with a cooling coil having inlet 50 and outlet 52. Condensed tetralin is flowed from the condenser through a pipe 54 and, by opening valve 56 in pipe 58, is flowed through the latter into a collecting tank 59 from which it can be returned to the reactor 4. A reflux of approximately one to one is normally maintained during distillation by means of a cooling coil 60 disposed in the top of the fractionating column 42.

After the tetralin has been distilled from the admixture, alpha tetralone and alpha tetralol are fractionated therefrom. The mixture of alpha tetralol and alpha tetralone is condensed in the condenser 48 and flows through pipe 54 and valved pipe 55 into a collecting tank 62.

The collected mixture of tetralone and tetralol in collecting tank 62 is flowed therefrom through a valved pipe 64 into a mixing tank 65 in which powdered catalyst is added to the mixture. The mixture is then pumped by a pump 66 through a valved pipe 67 into a reactor tower 68. Therein the liquid mixture is treated under pressure with hydrogen which is directed into the reactor through a pipe 69. Unreacted hydrogen flows from the reactor through a pipe 74 into a collecting tank 76 wherein suspended liquid is deposited. Hydrogen gas flows therefrom through a pipe 78 and can be returned for reuse to the pipe 69.

Hydrogenated tetralone-tetralol mixture now comprising substantially only tetralol and a minor portion of tetralin that is also formed during hydrogenation is drained from the reactor through a valved pipe 80 into a still 82 having a fractionating column 84. The still 82 is supplied with customary heating means such as a steam coil 85. The distillation in the still 82 is performed under a vacuum provided by pump 88. The distilled tetralin vapors flow from the fractionating column 84 through a pipe 86 and are condensed in a water-cooled condenser 87 and flow therefrom into a collecting tank 90, whence they can be returned to the reactor 4 for retreatment by oxidation.

The tetralol freed of tetralin and remaining as a residue in the still 82 can be discharged therefrom through a valved drain pipe 92 and be directed to storage means therefor. The tetralol so-produced is of high purity but it can be further purified by distillation, by fractional freezing, or by fractional crystallization with solvents.

The process has been presented as a batch process for the purpose of clarity. The process is particularly adaptable to continuous operation, especially the tetralin oxidation step, and to the recycling of compounds primarily of tetralin still-fractions to the oxidation step.

*Example*

Tetralin to which had been added .33% by weight of finely divided cupric carbonate was treated with air under pressure and at a temperature of 90° C. The air was passed through the liquid tetralin for three and one-half hours at which time a total conversion of 41 per cent by weight to tetralin peroxide and a minor quantity of other oxidation products was obtained. The catalyst was removed by filtration. The tetralin and oxidation products were thereafter agitated with a 15 per cent aqueous solution of sodium hydroxide at a temperature of 80° C. After thorough mixing of the reactants, the aqueous solution was permitted to settle and was drained from the mixture. A supernatant layer containing tetralin and alpha tetralol and alpha tetralone which was formed by decomposition of tetralin peroxide by the caustic treatment was thereafter separated and fractionally distilled to remove the tetralin therefrom. Distillation was performed under a vacuum of 10–25 mm. Hg absolute pressure. The vaporized tetralin was condensed and collected in a storage tank for recirculation to a second oxidation step. A second fraction containing the alpha tetralol and alpha tetralone was thereafter distilled, condensed and collected in a second storage tank. A yield of 82 per cent by weight of alpha tetralone and alpha tetralol was obtained based on the weight of tetralin converted to oxidation products. The alpha tetralone-alpha tetralol mixture comprised approximately 51 per cent of the ketone and 49 per cent of the alcohol. This mixture was mixed with 5 per cent of finely divided copper-oxide chromium-oxide and thereafter treated under pressure with hydrogen. This treatment was continued until absorption of hydrogen had substantially ceased, the hydrogen absorption being .6 mol of hydrogen per mol of charge. After separation of the catalyst from the so-treated mixture, it was found to comprise 3.9 per cent by weight of tetralin and the remainder alpha tetralol. The tetralin content as above reported of the resultant product was formed by adventitious hydrogenation of alpha tetralol and represents a notable reduction in proportion over that weight of tetralin which previously had been formed by hydrogenation procedure known to the prior art in which other catalysts or other methods were employed. The tetralin was distilled under vacuum from the described product providing thereby crystalline alpha tetralol of 94.7 per cent purity. Such product was dissolved in hydrocarbon solvent and repeatedly fractionally crystallized therefrom to provide pure crystalline alpha tetralol having a melting point of 32.3° C.

The alpha tetralone and alpha tetralol mixture was also produced non-catalytically by oxidation both with air and with oxygen and at atmospheric and superatmospheric pressures. In one instance tetralin was oxidized at 100° C. with air at 65 pounds per square inch gauge pressure and a 30 per cent conversion of tetralin to oxidation products comprising preponderantly tetralin peroxide was obtained. An average weight yield of 87 per cent of alpha tetralol and alpha tetralone was thereafter recovered by treatment of the oxidation products with aqueous sodium hydroxide solution. It was found that the sodium hydroxide solution must be maintained at a temperature of 60° C. or higher and preferably at a temperature of about 80°–100° C. to obtain an optimum conversion to alpha tetralol and alpha tetralone by the described decomposition of the tetralin peroxide.

The treatment of the tetralin-oxidation products with sodium hydroxide, as aforesaid, was found to produce a mixture of alpha tetralone and alpha tetralol in which the latter can be present to the extent of almost fifty per cent. This finding is contrary to published art which describes the treatment as producing solely the ketone. The preferred temperature range for caustic treatment is, as aforesaid, 60° to 100° C., and the preferred range of concentration is from about five to twenty per cent solution of the caustic alkali. At concentrations above the given upper limit, alkali metal salts tend to salt out instead of decomposing to form the ketone and alcohol. At concentrations below five per cent the formation of ketone rather than alcohol is favored, and separation by settling and decanting is more difficult as the more dilute solution is less dense.

The addition of a small amount of tetralin peroxide to the tetralin before the oxidation step aids in initiating the oxidation reaction. The oxidation reaction was also performed in the presence of manganous carbonate with only slightly reduced yields as compared to the cupric carbonate catalyst.

The invention as hereinabove set forth is embodied in particular form and manner but may be variously embodied within the scope of the claims hereinafter made.

I claim:

1. A process for the production of alpha tetralol from tetralin comprising the steps of: passing a gas containing oxygen through tetralin in liquid phase containing in suspension about 1 per cent of a comminuted metal carbonate catalyst and oxidizing tetralin to tetralin peroxide at a temperature between about 80° and 120° C.; treating the tetralin oxidation reaction product with an aqueous caustic solution at a temperature between about 60° and 120° C. to convert the tetralin peroxide to a mixture of alpha tetralone and alpha tetralol; decanting an oily mixture of tetralin, tetralone, and alpha tetralol from the caustic solution; distilling the decanted mixture in vacuo and separating tetralin therefrom; adding copper-oxide chromium-oxide catalyst to the remaining mixture of alpha tetralone and alpha tetralol; subjecting the admixture to hydrogen under pressure and at a temperature between about 90° to 110° C. and thereby hydrogenating alpha tetralone to alpha tetralol; distilling under vacuum to recover alpha tetralol.

2. A process for the production of alpha tetralol from tetralin comprising the steps of: continuously passing a gas containing oxygen through continuously added tetralin in liquid phase containing in suspension about 1 per cent of comminuted cupric carbonate to oxidize tetralin to tetralin peroxide at a temperature between about 80° and 120° C.; continuously withdrawing oxidized tetralin from the oxidation zone and treating the tetralin oxidation product with an aqueous caustic solution at a temperature between about 60° and 120° C. to convert the tetralin peroxide to alpha tetralone and alpha tetralol in about equal proportions; decanting an oily mixture of tetralin, tetralone, and alpha tetralol from the caustic solution; distilling the decanted mixture in vacuo to separate tetralin therefrom; adding copper-oxide chromium-oxide catalyst to the mixture of alpha tetralone and alpha tetralol; subjecting the admixture to hydrogen under pressure and at a temperature between about 90° and 110° C. to hydrogenate alpha tetralone to alpha tetralol; distilling under vacuum to separate tetralin, also formed during the hydrogenation step, from alpha tetralol, and returning so-separated tetralin from each distillation step to the oxidation step.

3. A process for the production of alpha tetralol from tetralin comprising the steps of: continuously passing a gas containing oxygen through continuously added tetralin in liquid phase containing in suspension about 1 per cent of comminuted cupric carbonate and controllably oxidizing tetralin to tetralin peroxide at a temperature between about 80° and 120° C.; continuously withdrawing oxidized tetralin from the oxidation zone and treating the tetralin oxidation product with an aqueous caustic solution at a temperature between about 60° and 120° C. to convert contained tetralin peroxide to alpha tetralone and alpha tetralol; continuously decanting an oily mixture of tetralin, tetralone, and alpha tetralol from the caustic solution; continuously distilling the decanted mixture in vacuo and separating tetralin therefrom; adding copper-oxide chromium-oxide catalyst to the remaining mixture of alpha tetralone and alpha tetralol; continuously subjecting the admixture to hydrogen under pressure at a temperature between about 90° to 110° C. to convert the alpha tetralone to alpha tetralol; continuously distilling the alpha tetralol under vacuum to separate tetralin therefrom; continuously recycling so-separated tetralin from each distillation step to the oxidation step; recovering alpha tetralol from the so-distilled product; and crystallizing, by a plurality of fractional freezing steps, to obtain substantially pure crystalline alpha tetralol.

4. In a process for the synthesis of alpha tetralol from tetralin, the process of converting alpha tetralone, formed during the synthesis reactions, to alpha tetralol comprising: hydrogenating the mixture containing alpha tetralone in liquid phase in the presence of finely divided copper-oxide chromium-oxide catalyst at a temperature between about 90° and 110° C.

5. In a process for the synthesis of alpha tetralol in improved yields and purity from tetralin, in which process tetralin is controllably oxidized with an oxygen containing gas to form tetralin peroxide and a minimum of more completely oxidized products, the steps in combination of decomposing the tetralin peroxide with aqueous caustic solution to form alpha tetralol and alpha tetralone, and converting the alpha tetralone to alpha tetralol by hydrogenating under pressure in the presence of copper-oxide chromium-oxide catalyst at a temperature between about 90° to 110° C.

6. A process for the synthesis of improved yields of alpha tetralol from tetralin comprising: adding a relatively small amount of tetralin peroxide by weight to tetralin and catalytically oxidizing the tetralin with oxygen-containing gas to form tetralin peroxide; decomposing tetralin peroxide with aqueous caustic solution and forming therefrom alpha tetralone and alpha tetralol; distilling, in vacuo, non-oxidized tetralin from the tetralone and tetralol; thereafter hydrogenating the alpha tetralone under pressure in the presence of copper-oxide chromium-oxide catalyst at a temperature between about 90° C. and 110° C. to form alpha tetralol; distilling, in vacuo, to separate tetralin from the so-formed alpha tetralol; and crystallizing the alpha tetralol by a plurality of fractional crystallizations from solution in a hydrocarbon solvent thereby to recover substantially pure crystalline alpha tetralol.

ROBERT JOHNSON.

REFERENCES CITED

The following references are of record in the file of this patent:

UNITED STATES PATENTS

| Number | Name | Date |
|---|---|---|
| 2,091,800 | Adkins | Aug. 31, 1937 |

FOREIGN PATENTS

| Number | Country | Date |
|---|---|---|
| 709,322 | Germany | July 3, 1941 |

OTHER REFERENCES

Medvedev: Chemical Abstracts, vol. 34, col. 7707 (1940).

Linstead: Jour. Chem. Soc., London, 1940, pages 1134–1139.

Hock: Ber. Deut. Chem., vol. 75B, pages 313–316 (1942).